(12) United States Patent
Auberg et al.

(10) Patent No.: US 10,691,084 B2
(45) Date of Patent: Jun. 23, 2020

(54) SPRAY RIG MONITORING SYSTEM

(71) Applicants: Aaron Auberg, Pella, IA (US); Matthew R. Hugg, Pella, IA (US)

(72) Inventors: Aaron Auberg, Pella, IA (US); Matthew R. Hugg, Pella, IA (US)

(73) Assignee: Aaron Auberg, Pella, IA (US)

( * ) Notice: Subject to any disclaimer, the term of this patent is extended or adjusted under 35 U.S.C. 154(b) by 141 days.

(21) Appl. No.: 15/593,901

(22) Filed: May 12, 2017

(65) Prior Publication Data

US 2018/0329436 A1    Nov. 15, 2018

(51) Int. Cl.
| | |
|---|---|
| *G05D 7/06* | (2006.01) |
| *G05B 15/02* | (2006.01) |
| *B05B 12/00* | (2018.01) |
| *B05B 12/14* | (2006.01) |

(52) U.S. Cl.
CPC ............ *G05B 15/02* (2013.01); *B05B 12/004* (2013.01); *B05B 12/14* (2013.01)

(58) Field of Classification Search
CPC .............................. G05D 7/0676; G05B 15/02
See application file for complete search history.

(56) References Cited

U.S. PATENT DOCUMENTS

| | | | | |
|---|---|---|---|---|
| 7,264,178 B1* | 9/2007 | Hugg | .................... | B29B 7/7447 165/51 |
| 8,561,921 B1* | 10/2013 | Showman | ............. | B05B 7/0018 239/414 |
| 2007/0057082 A1* | 3/2007 | Mc Gloughlin | .......... | B05B 7/32 239/11 |
| 2016/0066589 A1* | 3/2016 | Massey | .................... | A23B 4/30 99/486 |
| 2016/0107179 A1* | 4/2016 | McAndrew | ............. | B05B 9/002 239/13 |

OTHER PUBLICATIONS

GRACO, Reactor Spray Foam and Polyurea Equipment, Nov. 2015, pp. 1-20.
Smart Spray, smartsprayconnect, 2017, pp. 1-7.

* cited by examiner

*Primary Examiner* — Xin Y Zhong
(74) *Attorney, Agent, or Firm* — Zarley Law Firm, P.L.C

(57) ABSTRACT

A spray rig monitoring system having a plurality of sensors that detect and transmit operational parameters to a computer. The operational parameters are processed to determine if a spray rig and its crew are operating within preset parameters.

3 Claims, 2 Drawing Sheets

SPRAY RIG MONITORING SYSTEM

BACKGROUND OF THE INVENTION

This invention is directed to a spray rig monitoring system and more particularly a spray rig monitoring system where monitoring and analysis occur in real time.

Spray rigs are well known in the art for spraying foam or a coating on a surface. Typically spray rigs are manually operated where a pair of spray components are mixed and sprayed on a surface so that a chemical reaction between the spray components occurs that results in a final product.

To produce a final product that meets required specification spray rig performance is critical. The primary obstacles to proper installation of the final product are the ratio between the spray components, the pressure of the spray components, and the temperature of the spray components.

When a final product is installed off ratio where there is an excess of one of the spray components, or if the product is sprayed at incorrect temperatures or pressures, whether too high or too low, the resulting final product likely will not cure and the desired characteristics of the final product will not be achieved. It may also have a strong lingering odor as the raw chemicals leach or off-gas out of the product and can build up excessive heat that can cause charring or sometimes fire. It may also have cell structure that is too large or too small, and a density that is too high or too low. As a result, the final product will not achieve the correct R-value (insulating value), vapor permeance, tensile or compressive strength and the like. The final product also could experience charring, shrinking, poor yield, and poor dimensional stability. Worse, it may cause fire, or leach or off-gas hazardous vapors into the immediate surrounding area harmful to humans Presently, determining a proper ratio of spray components in the field is difficult to figure. To do so operators attempt extrapolate volumetric ratio by measuring pressure of individual components within the system while taking into account the viscosity of the individual components. The failsafe process for operators to confirm the production of an acceptable final product is to measure the density of the final product. If the final product does not meet required specifications, the final product must be torn out and re-sprayed. This process can only be performed on a small sample percentage of the total finished product for any given project and cannot reliably provide confirmation of acceptable product throughout the entire production process. Accordingly there exists a need in the art for a monitoring system that addresses these deficiencies.

As such, an objective of the present invention is to provide a spray rig monitoring system that more accurately monitors spray component ratio, temperature, ambient temp, RH %, and barometric pressure.

Another objective of the present invention is to provide a spray rig monitoring system that monitors operational parameters of a spray rig in real time.

A still further objective of the present invention is to provide a spray rig monitoring system that provides notification to an operator when operational parameters exceed preset thresholds.

These are other objectives will be apparent to those skilled in the art based upon the following written description, drawings, and claims.

SUMMARY OF THE INVENTION

A spray rig monitoring system includes a spray rig that pumps, proportions, heats, mixes and sprays multiple, individual raw chemical components in order to produce a unique finished product whether a foam or a coating.

Connected to and in communication with the proportioner is a spray gun that mixes the first and second (and potentially additional) spray components and sprays the mixture under pressure onto a surface. Connected throughout the rig assembly are a plurality of sensors that detect a plurality of operational parameters of the spray rig assembly. The sensors are also connected to and transmit detected data to a central computer mounted on the rig assembly. In addition to processing and storing the detected data, the central computer transmits the data to a cloud based storage.

A home or base computer is able to access a cloud based website and the data stored in the cloud based storage. Data can be exported to the home computer via downloadable data (excel) file for further analysis/manipulation. The basic analysis/storage/processing of the data is done on the cloud server and is only viewed (browsed) via website by the home computer. In addition, the home computer, through a dashboard on the website, is able to access and analyze operational parameters in real time. The operational parameters are related to, but are not limited to, the equipment on the spray rig assembly. The location and travel routes of the spray rig assembly, the security of the spray rig assembly, operational parameters for a specific project, sales and estimating parameters, crew performance and goals, safety parameters, equipment maintenance and the like.

In addition, the central computer and/or the home computer compare detected data with preset operational thresholds input into the computer(s) by an operator. When a detected parameter exceeds a preset threshold a notification is sent to the operator.

DETAILED DESCRIPTION OF THE PREFERRED EMBODIMENT

Figure 1:
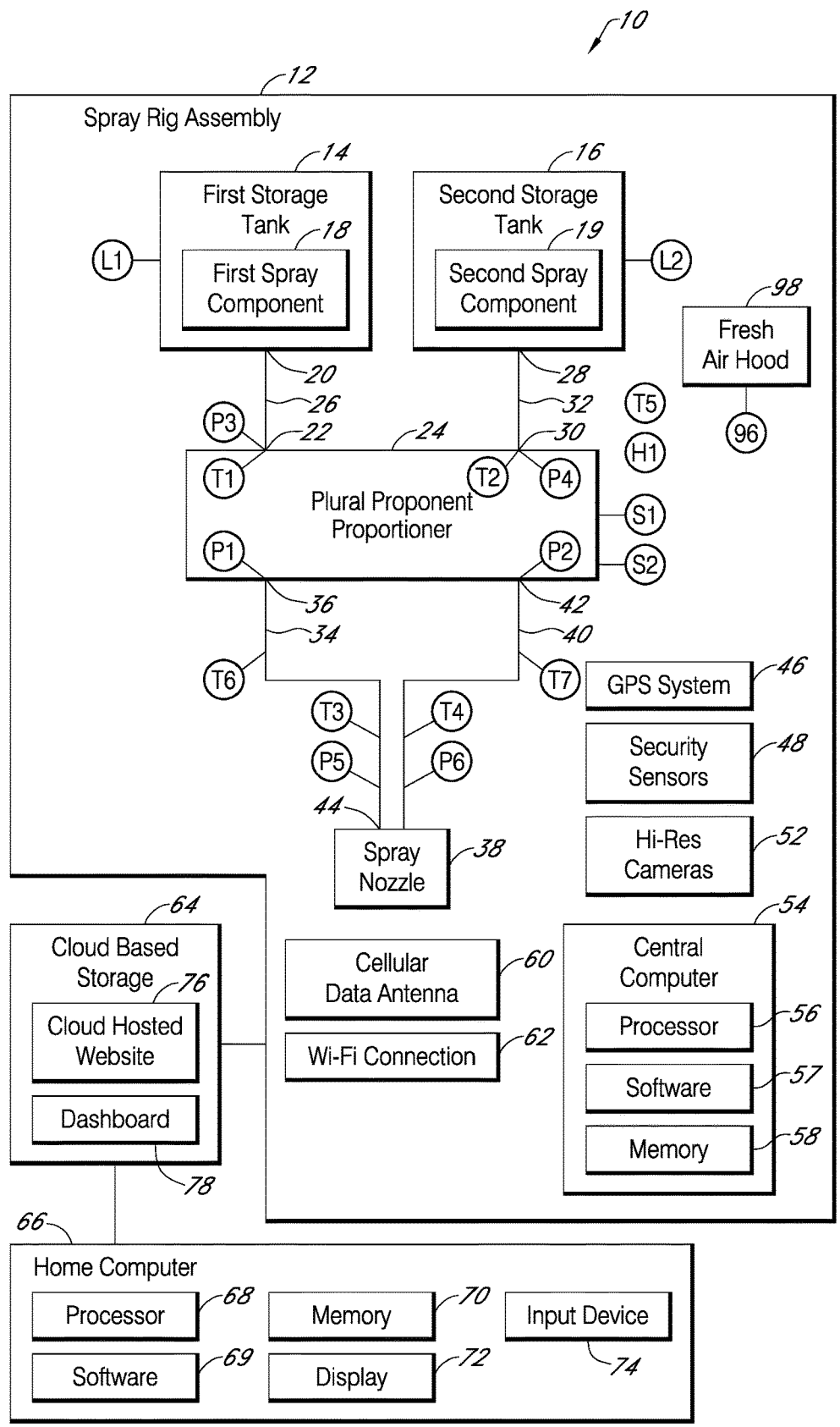
FIG. 1 is a schematic view of an environment for rig monitoring system.
Figure 2:
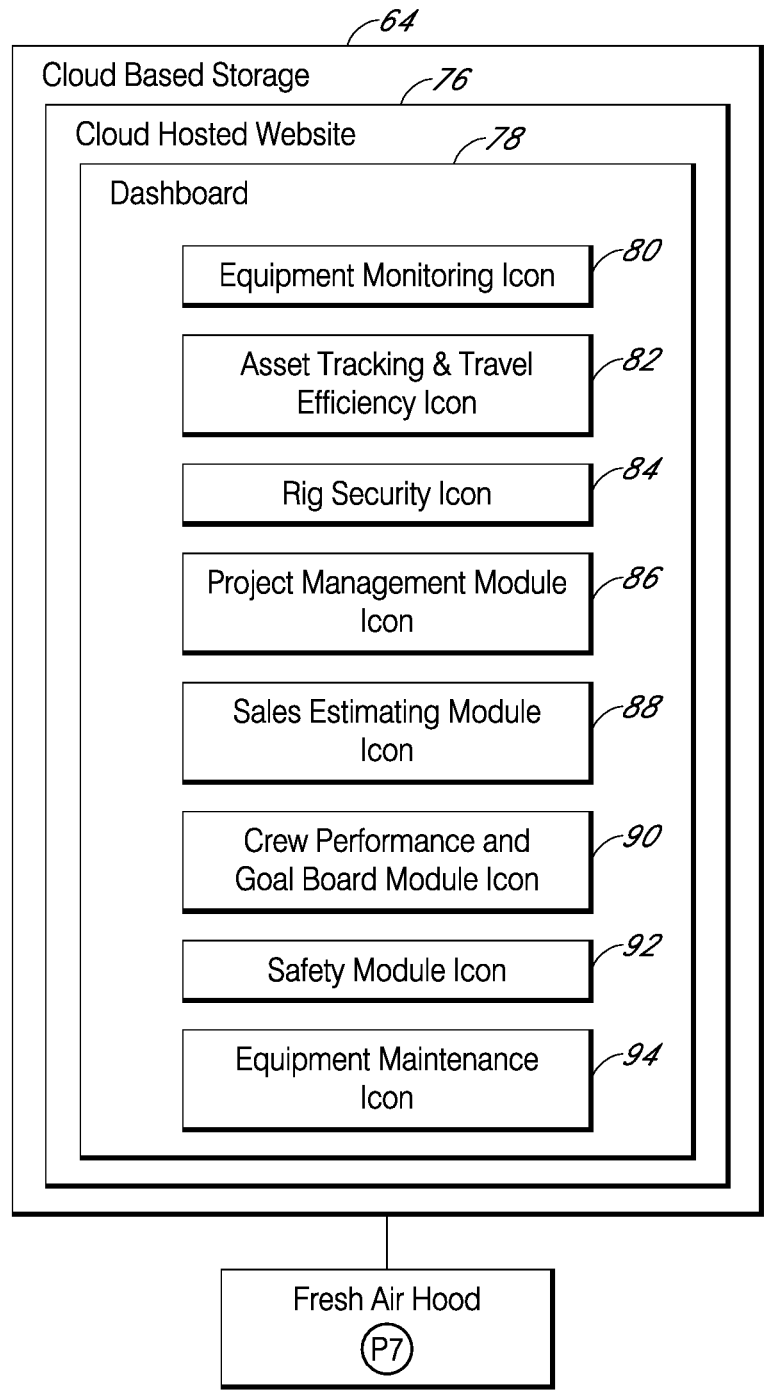
FIG. 2 is a schematic view of a portion of an environment of a spray rig monitoring system.

Referring to the Figures a spray rig monitoring system 10 is used in relation to a spray rig assembly 12. The spray rig assembly 12 is of any configuration and in one example the spray rig assembly 12 has a first tank 14 and a second tank 16 that store a first spray component 18 and a second spray component 19 respectively. Alternatively any number of tanks and/or spray components are used. Customarily, in typical spray rig raw liquid components would be held in 55 gallon drums but may also be held in fixed bulk tanks, 250 gallon totes, 5 gallon pails, or other.

Connected to and extending from an outlet (such as a pump with a dip tube that is inserted into the drum 20) on the first tank 14 to a first inlet 22 on a plural component proportioner 24 is a first conduit 26. Extending from and connected to an outlet 28 on the second tank 16 and a second inlet 30 on the plural component proportioner 24 is a second conduit 32. The proportioner 24, as is known in the art, pumps, proportions, pressurizes and heats the spray components 18 and 19.

A third conduit 34 is connected to and extends from a first outlet 36 on the proportioner 24 to a spray nozzle 38. A fourth conduit 40 is connected to and extends from a second outlet 42 on the proportioner 24 to the spray nozzle 38. Adjacent the spray nozzle 38, both conduits 34 and 40 narrow to form a section known as a whip 44 which permits easier maneuverability of the spray nozzle 38.

Connected throughout the spray rig assembly 12 are a plurality of sensors. The sensors are of any type and are connected at any place on the rig assembly 12 to sense an operational parameter of the assembly. In one example, pressure sensors P1, P2, P3, and P4 are connected to the first outlet 36, the second outlet 42, the first inlet 22, and the second inlet 30 of the proportioner 24 respectively. Additional pressure sensors P5 and P6 are connected to the third 34 conduit and the fourth conduit 40 respectively at the whip section 44.

Temperature sensors T1 and T2 are connected to the first inlet 22 and the second inlet 30 of the proportioner 24 respectively. Temperature sensors T3 and T4 are connected to conduits 34 and 40 respectively at the whip section 44. Temperature sensors T6 and T7 are connected to the third conduit 34 and fourth conduit 40 respectively. Also connected to the rig assembly 12 is an ambient temperature sensor T5 and an ambient relative humidity sensor H1. Connected to the proportioner is a stroke counter sensor S2 that also detects whether the pump is spraying or stationary. Connected to each tank 14 and 16 are load sensors L1 and L2 that determine the weight of each tank 14 and 16.

The rig assembly 12 also has a GPS system 46, security sensors 48 on all walk-thru and rear doors, motion activated hi-res cameras 52 with audio on the interior of the rig assembly 12 and on the exterior of the rig assembly 12. All sensors, the GPS system 46, security sensor 48, load sensors L1 and L2 and motion activated cameras 52 are all connected, preferably wirelessly, to a central computer 54 mounted to the rig assembly 12. The central computer 54 has software 57 and memory 58. The memory 58 permits data to be logged locally for secure data backup and improved accuracy. The central computer 54 also transmits data via a cellular data antenna 60, a Wi-Fi connection 62, or the like to a cloud based storage 64.

A home computer 66, having a processor 68, software 69, memory 70, display 72, and input device 74, is able to access the data in the cloud based storage 64 through a cloud hosted website 76. The website 76 has a dashboard 78 having selection icons for equipment monitoring 80, asset tracking and travel efficiency 82, rig security 84, project management module 86, sales and estimating module 88, a crew performance and goal board module 90, and a safety module 92.

The equipment monitoring icon 80 permits selection of data related to one of multiple spray rig assemblies 12. The data, which is logged multiple times per second for precise accuracy displays an instant visual representation of all data, preferably with real time graphing. The data displayed includes all operational parameters such as pressure and temperature at different locations, proportioner status, and ambient temperature and humidity. Also displayed is the number of strokes and the ration of the spray component disbursement. The ratio of the spray component disbursement is determined by either the processor 56 of the central computer 54 or the processor 68 of the home computer 66 by calculating the weight loss of each tank 14 and 16 per stroke as detected by load sensors L1 and L2. In addition, the ratio of the spray component can be calculated by either processor 56 and/or 68 based upon a comparison of the pressure and/or temperature in the conduits and particularly in the whip section 44 (or at proportioner outlets 36 & 42).

Using the input device 74, an individual sets high and low thresholds for all pressure and temperature sensors. When a high or low threshold or limit is exceeded, processor 56 and/or processor 68, by comparing sensed operational parameters with input thresholds, automatically sends an alarm or notification to the rig, an operator and/or the sprayer(s). The alarm/notification is of any type such as sound, light, message or the like and is transmitted in any manner such as by e-mail, text, phone, pop-up, or the like. Similarly, a warning is sent to an operator when a sensed operating parameter falls within a predetermined and pre-input safety margin of the preset threshold. Once a warning or alarm is sent an operator can adjust the operation of the spray rig assembly 12 or shut the assembly off and determine if and/or where the mixed spray component was sprayed off spec.

The asset tracking and travel efficiency selection icon 82 permits selection of and display of data related to the location and transport of one of multiple rigs 12. Based upon sensed GPS data from the GPS system 46, processor 56 and/or 68 determines and may display the route the rig assembly 12 took to and from the job site, stops made along the route and the duration of the stop, provides alerts for departure and arrival at the shop and/or job site, and the maximum time and distance the rig assembly 12 is from the shop. An operator, using the input device 74, may input the shop location, the job site location, desired departure and arrival times at the shop and job site, and the maximum speed limit for the rig assembly 12. From the sensed data compared to the input information, processor 56 and/or 68 generates and displays reports that show how crews comply with input travel standards, travel efficiency, and analyze travel risks and losses to improve coaching and management.

The rig security icon 84 permits an operator to monitor the security of multiple rigs. Using the input device 74 and operator places a rig in a locked down or secure mode. If, during the sure mode, activity is sensed by door sensors 48 or motion activated cameras 52, in addition to recording the sensed activity, processor 56 and/or 68 sends an alarm to the operator notifying the operator of unintended activity. The alarm can also be sent to local law enforcement. When not in secure mode, door sensors 48 and motion activated cameras 52 still record activity which is stored.

The project management module icon 86 permits an operator to manage and analyze projects. Using the input device 74, an operator inputs project information that includes, but is not limited to the project's date(s), the assigned crew and rig, and the product needed for the project and other relevant data/job parameters/requirements. Processor 56 and/or 68 receive data from sensed and input data and generates and displays reports that permit an operator to manage production. As an example, the different projects and their scheduled dates are displayed on a project calendar. Also a report showing crew and rig allocation and capacity is also available for display. Also a report is available for display that permits product and lot identification and tracking. Processor 56 and/or 68 also monitors variance between sensed project results and input project expectations and when preset thresholds are exceed, including, but not limited to, low production capacity and low inventory, actual labor exceeds estimated, actual material usage exceeds estimated, alerts are sent to the operator. Also, an operator is able to display and export reports on job progress, job completion, and job variance as well as incident reports.

The sales and estimating module icon 88 permit an operator, using the input device 71, input customer information and proposed project information. Based upon the proposed project information, the processor 56 and/or 68 calculates a project estimate that is displayed and/or exported as part a project proposal. The processor 56 and/or 68 also, based on the input information, automatically manages customer relationship communications based upon preset parameters and generates and displays information related to sales forecasting and sales activity tracking.

An equipment maintenance icon 94 permits an operator to monitor equipment and inventory based on input parameters, processor 56 and/or 68 tracks scheduled maintenance for equipment such as proportioners sensors, air compressors, fresh air systems, and the like and send alerts to the operator when maintenance is needed. Also, based upon sensed and input information, processor 56 and/or 68 track consumables and generates and displays reports of stock items needed.

The crew performance and goal board module icon 90 permits an operator, using the input device 74, to set goals for the crew for travel efficiency, material usage, maintenance, project duration, and the like. Processor 56 and/or 68 based on sensed data, compares the sensed data to the input goals and then generates and displays a report that shows whether goals have been achieved.

The safety module icon 92 permits an operator to monitor whether proper safety procedures are being followed by crew members. In particular, a pressure sensor P7 is placed on a fresh air hood 98 of each crew member. Processor 56 and/or 68 monitor the pressure in the head 98 and compare with the stroke counter 52. If the pressure and stroke counter do not match then the crew member is likely spraying without wearing the fresh air head 98 which is a safety violation. The processor 56 and/or 68 generates and displays a report, as well as provides an alert when a safety violation occurs.

What is claimed is:

1. A spray rig monitoring system, comprising:
    a rig assembly having a first and a second tank having a first and a second spray components connected to a plural proponent proportioner;
    a spray gun connected to the plural proponent proportioner;
    the spray gun having a spray nozzle;
    a pair of conduits connected to and between the spray gun and the plural proponent proportioner;
    a whip section formed by a section of the pair of conduits narrowing towards the spray nozzle;
    a plurality of sensors connected to the rig assembly and to a central computer, wherein the plurality of sensors include at least one pressure sensor in the whip section;
    a cloud based storage system connected to the central computer and a home computer; and
    the home computer having a display that shows in real time operational parameters of the rig assembly detected by the plurality of sensors.

2. The monitoring system of claim 1 wherein the detected operational parameters are shown on the display using real time graphing.

3. The monitoring system of claim 1 wherein at least one of the central computer and the home computer transmit a notification to an operator when a detected operating parameter exceeds a predetermined threshold.

* * * * *